United States Patent
Chen et al.

(10) Patent No.: US 8,762,518 B2
(45) Date of Patent: Jun. 24, 2014

(54) PROGRAM AND METHOD FOR ADAPTIVELY MAINTAINING A LOCAL PEER GROUP IN A DYNAMIC ENVIRONMENT

(75) Inventors: Wai Chen, Parsippany, NJ (US);
Taek-Jin Kwon, Morganville, NJ (US);
Ryokichi Onishi, Kanagawa (JP); Rama Vuyyuru, Somerset, NJ (US)

(73) Assignees: Telcordia Technologies, Inc., Piscataway, NJ (US); Toyota Infotechnology Center U.S.A., Inc., Palo Alto, CA (US)

(*) Notice: Subject to any disclaimer, the term of this patent is extended or adjusted under 35 U.S.C. 154(b) by 602 days.

(21) Appl. No.: 12/500,696

(22) Filed: Jul. 10, 2009

(65) Prior Publication Data
US 2011/0010446 A1    Jan. 13, 2011

(51) Int. Cl.
*G06F 15/16* (2006.01)
*G06F 15/173* (2006.01)

(52) U.S. Cl.
USPC ............ 709/224; 709/209; 709/237; 709/244

(58) Field of Classification Search
USPC ........................................................ 709/224
See application file for complete search history.

(56) References Cited

U.S. PATENT DOCUMENTS

| | | | | |
|---|---|---|---|---|
| 6,832,251 B1 * | 12/2004 | Gelvin et al. | ................ | 709/224 |
| 6,917,985 B2 * | 7/2005 | Madruga et al. | ............... | 709/238 |
| 7,016,946 B2 * | 3/2006 | Shirriff | ......................... | 709/221 |
| 7,027,773 B1 * | 4/2006 | McMillin | ..................... | 455/41.2 |
| 7,043,550 B2 * | 5/2006 | Knop et al. | ................... | 709/224 |
| 7,089,099 B2 * | 8/2006 | Shostak et al. | .................. | 701/32 |
| 7,103,460 B1 * | 9/2006 | Breed | ............................. | 701/29 |
| 7,263,560 B2 * | 8/2007 | Abdelaziz et al. | ............ | 709/238 |
| 7,295,119 B2 * | 11/2007 | Rappaport et al. | ......... | 340/572.4 |
| 7,310,335 B1 * | 12/2007 | Garcia-Luna-Aceves et al. | ............................ | 370/390 |
| 7,327,683 B2 * | 2/2008 | Ogier et al. | .................... | 370/236 |
| 7,333,026 B2 * | 2/2008 | Hunzinger | .................... | 340/903 |
| 7,421,321 B2 * | 9/2008 | Breed et al. | ...................... | 701/29 |
| 7,492,764 B2 * | 2/2009 | Cheng et al. | .................. | 370/389 |
| 7,532,585 B2 * | 5/2009 | Kim et al. | ...................... | 370/254 |
| 7,533,172 B2 * | 5/2009 | Traversat et al. | ............. | 709/225 |
| 7,558,557 B1 * | 7/2009 | Gollnick et al. | ........... | 455/343.4 |

(Continued)

OTHER PUBLICATIONS

Chen, Wai. "Dynamic Local Peer Group Organizations for Vehicle Communications," 3rd Annual Intl Conference on Mobile and Ubiquitous Systems, Jul. 21, 2006, pp. 1-8.*

(Continued)

*Primary Examiner* — Melvin H Pollack
(74) *Attorney, Agent, or Firm* — Philip J. Feig

(57) ABSTRACT

A method for maintaining a local peer group (LPG) for supporting communications among vehicles. The LPG is formed from a plurality of vehicles. Each vehicle is equipped with a wireless communications device. One of the vehicles is selected as a group header node (GH). The method comprises receiving periodically a heartbeat packet from the GH, the heartbeat packet including a maximum hop count, and a heartbeat cycle, forwarding the heartbeat packet until the maximum hop count is reached after waiting for a first random relay delay, which is less than a maximum allowable adjustable value, replying to the heartbeat packet with a membership report packet, forwarding a membership report packet towards the GH, and adding a vehicle that submitted the membership report packet to a LPG membership as a member node of the LPG if the membership report packet is new or updating information for a member node.

23 Claims, 9 Drawing Sheets

(56) References Cited

U.S. PATENT DOCUMENTS

| | | | | |
|---|---|---|---|---|
| 7,567,547 | B2* | 7/2009 | Mosko et al. | 370/351 |
| 7,584,298 | B2* | 9/2009 | Klinker et al. | 709/238 |
| 7,593,999 | B2* | 9/2009 | Nathanson | 709/217 |
| 7,653,394 | B2* | 1/2010 | McMillin | 455/444 |
| 7,657,373 | B2* | 2/2010 | Kindo | 701/413 |
| 7,664,054 | B2* | 2/2010 | Adya et al. | 370/255 |
| 7,668,146 | B2* | 2/2010 | Levendel et al. | 370/338 |
| 7,684,346 | B2* | 3/2010 | Valli | 370/252 |
| 7,701,858 | B2* | 4/2010 | Werb et al. | 370/241 |
| 7,729,336 | B2* | 6/2010 | Pun et al. | 370/350 |
| 7,733,855 | B1* | 6/2010 | Torudbaken et al. | 370/389 |
| 7,734,803 | B2* | 6/2010 | Laberteaux et al. | 709/231 |
| 7,738,364 | B2* | 6/2010 | Bain | 370/228 |
| 7,742,425 | B2* | 6/2010 | El-Damhougy | 370/241 |
| 7,779,148 | B2* | 8/2010 | Arimilli et al. | 709/235 |
| 7,787,450 | B1* | 8/2010 | Chan et al. | 370/389 |
| 7,801,042 | B2* | 9/2010 | Liu et al. | 370/235 |
| 7,813,326 | B1* | 10/2010 | Kelm et al. | 370/338 |
| 7,822,384 | B2* | 10/2010 | Anschutz et al. | 455/41.2 |
| 7,831,697 | B2* | 11/2010 | Fukushima | 709/223 |
| 7,848,278 | B2* | 12/2010 | Chen et al. | 370/328 |
| 7,860,049 | B2* | 12/2010 | Yagyuu et al. | 370/328 |
| 7,873,343 | B2* | 1/2011 | Gollnick et al. | 455/343.3 |
| 7,881,340 | B2* | 2/2011 | Farrag et al. | 370/468 |
| 7,881,667 | B2* | 2/2011 | Ji et al. | 455/41.2 |
| 7,885,243 | B2* | 2/2011 | da Costa et al. | 370/338 |
| 7,916,666 | B2* | 3/2011 | Yoon et al. | 370/255 |
| 7,920,500 | B2* | 4/2011 | Kobayashi et al. | 370/315 |
| 7,933,271 | B2* | 4/2011 | Shin et al. | 370/392 |
| 7,936,713 | B2* | 5/2011 | Kubler et al. | 370/328 |
| 7,940,669 | B2* | 5/2011 | Vaswani et al. | 370/238 |
| 7,957,365 | B2* | 6/2011 | Hsu et al. | 370/351 |
| 7,969,911 | B2* | 6/2011 | Mahany et al. | 370/254 |
| 7,969,914 | B1* | 6/2011 | Gerber et al. | 370/256 |
| 7,975,006 | B2* | 7/2011 | Hammons et al. | 709/203 |
| 7,996,496 | B2* | 8/2011 | Haartsen et al. | 709/219 |
| 8,022,822 | B2* | 9/2011 | Liang et al. | 340/539.18 |
| 8,064,377 | B2* | 11/2011 | Yi et al. | 370/312 |
| 8,068,463 | B2* | 11/2011 | Chen et al. | 370/334 |
| 8,072,902 | B2* | 12/2011 | Moon | 370/254 |
| 8,085,743 | B2* | 12/2011 | Buer et al. | 370/338 |
| 8,086,736 | B2* | 12/2011 | Omino et al. | 709/227 |
| 8,102,792 | B2* | 1/2012 | O'Neill | 370/313 |
| 8,108,455 | B2* | 1/2012 | Yeager et al. | 709/202 |
| 8,134,950 | B2* | 3/2012 | Pun | 370/238 |
| 8,144,595 | B1* | 3/2012 | Troxel et al. | 370/238 |
| 8,149,716 | B2* | 4/2012 | Ramanathan et al. | 370/238 |
| 8,150,946 | B2* | 4/2012 | Wu et al. | 709/220 |
| 8,185,653 | B2* | 5/2012 | Yau et al. | 709/238 |
| 8,194,550 | B2* | 6/2012 | Shorey et al. | 370/235 |
| 8,208,382 | B2* | 6/2012 | Jerbi et al. | 370/241 |
| 8,213,409 | B2* | 7/2012 | Rudnick et al. | 370/351 |
| 2002/0042693 | A1* | 4/2002 | Kampe et al. | 702/186 |
| 2002/0061001 | A1* | 5/2002 | Garcia-Luna-Aceves et al. | 370/338 |
| 2004/0090943 | A1* | 5/2004 | da Costa et al. | 370/338 |
| 2004/0133640 | A1* | 7/2004 | Yeager et al. | 709/204 |
| 2006/0126611 | A1* | 6/2006 | Kelly et al. | 370/389 |
| 2007/0091889 | A1* | 4/2007 | Xiao et al. | 370/390 |
| 2007/0109117 | A1* | 5/2007 | Heitzmann et al. | 340/539.12 |
| 2008/0004904 | A1* | 1/2008 | Tran | 705/2 |
| 2008/0040509 | A1* | 2/2008 | Werb et al. | 709/242 |
| 2008/0195719 | A1* | 8/2008 | Wu et al. | 709/213 |
| 2009/0154343 | A1* | 6/2009 | Fitch et al. | 370/221 |
| 2009/0219194 | A1* | 9/2009 | Menouar et al. | 342/146 |
| 2009/0247241 | A1* | 10/2009 | Gollnick et al. | 455/574 |
| 2009/0279481 | A1* | 11/2009 | Garcia Vidal et al. | 370/328 |
| 2010/0150122 | A1* | 6/2010 | Berger et al. | 370/338 |
| 2010/0202346 | A1* | 8/2010 | Sitzes et al. | 370/328 |
| 2011/0035491 | A1* | 2/2011 | Gelvin et al. | 709/224 |
| 2011/0047230 | A1* | 2/2011 | McGee | 709/206 |
| 2011/0098877 | A1* | 4/2011 | Stahlin et al. | 701/33 |

OTHER PUBLICATIONS

Malpani, Navneet et al. "Leader Election Algorithms for Mobile Ad Hoc Networks," Proceedings of the 4th Intl Workshop on Discrete Algorithms and Methods for Mobile Computing and Communications, 2000, pp. 96-103.*

Toner, Stephen and O'Mahony, Donal. "Self-Organizing Node Address Management in Ad Hoc Networks," Personal Wireless Communications, Lecture Notes in Computer Science, vol. 2775, 2003, pp. 476-483.*

Corson, S. and Macker, J. "Mobile Ad Hoc Networking (MANET): Routing Protocol Performance Issues and Evaluation Considerations," RFC 2501, Jan. 1999, pp. 1-12.*

Clausen, T. et al. "Generalized Mobile Ad Hoc Network (MANET) Packet/Message Format," RFC 5444, Feb. 2009, pp. 1-60.*

Chakeres, I. "IANA Allocations for Mobile Ad Hoc Network (MANET) Protocols," RFC 5498, Mar. 2009, pp. 1-5.*

Gill, V. et al. "The Generalized TTL Security Mechanism (GTSM)," RFC 5082, Oct. 2007, pp. 1-16.*

Agarwal, P. and Akyol, B. "Time to Live (TTL) Processing in Multi-Protocol Label Switching (MPLS) Networks," RFC 3443, Jan. 2003, pp. 1-10.*

Faucheur, F. Le and Rosen, E. "Advertising IPv4 Network Layer Reachability Information with an IPv6 Next Hop," RFC 5549, May 2009, pp. 1-10.*

Baker, F. and Polk, J. "Implementing an Emergency Telecommunications Service (ETS) for Real-Time Services in the Internet Protocol Suite," RFC 4542, May 2006, pp. 1-42.*

Bonica, R. et al. "ICMP Extensions for Multiprotocol Label Switching," RFC 4950, Aug. 2007.*

Clausen, T. and Dearlove, C. "Representing Multi-Value Time in Mobile Ad Hoc Networks (MANETs)," RFC 5497, Mar. 2009, pp. 1-14.*

* cited by examiner

FIG. 3
300

| RANDOM GID (305) | |
|---|---|
| GROUP HEADER ID (IPv6 ADDRESS) (310) | |

| SEQ. NO (315) | HB CYCLE (320) | GROUP LIST (335) |
|---|---|---|
| ToHB (325) / HC to GH (330) | | HB WAIT TIME (340) |

MAX HOP COUNT (345)

MAXIMUM AVAILABLE DELAY (350)

. . . . . . .

400

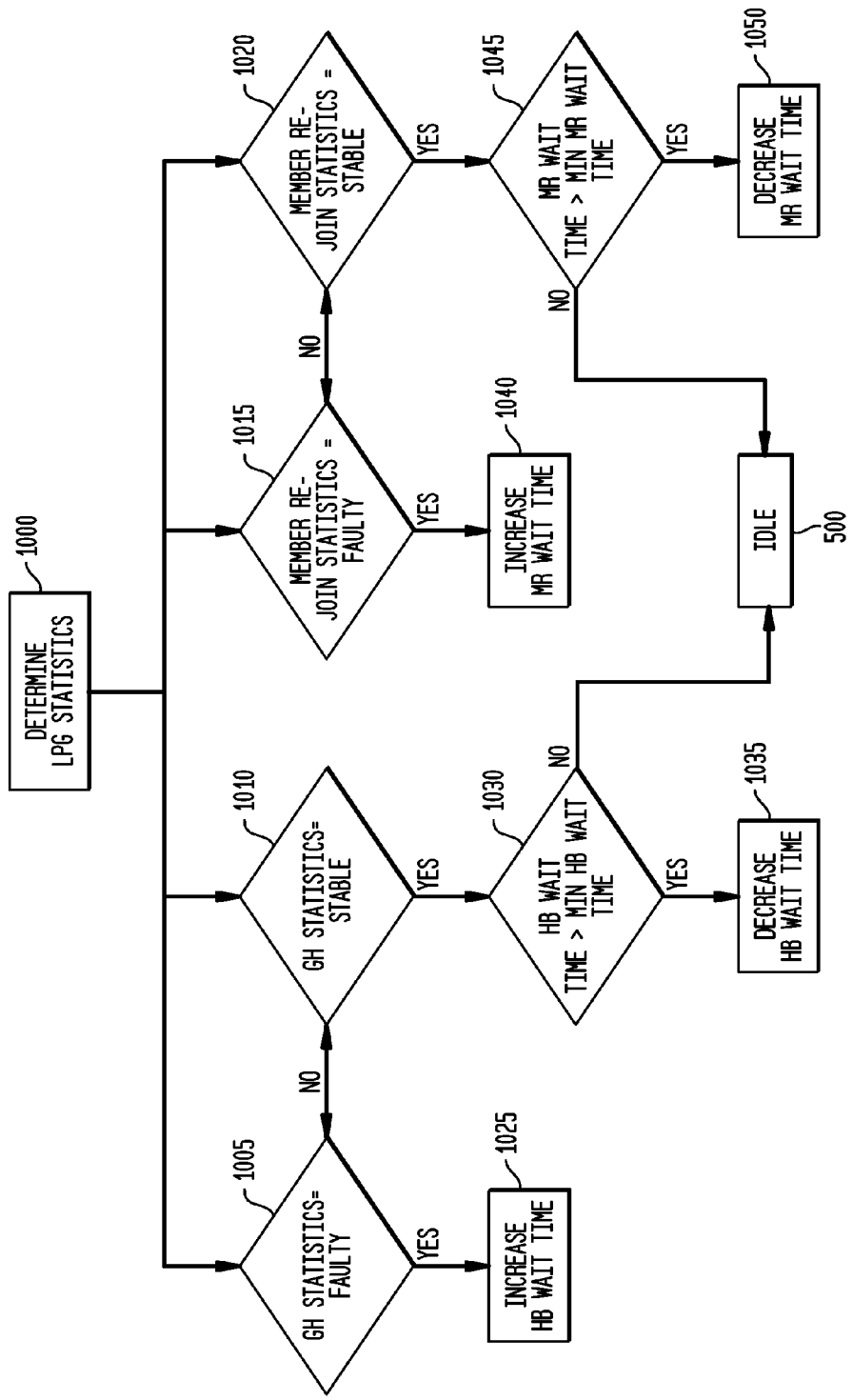

PROGRAM AND METHOD FOR ADAPTIVELY MAINTAINING A LOCAL PEER GROUP IN A DYNAMIC ENVIRONMENT

CROSS-REFERENCE TO RELATED APPLICATIONS

The present invention is related to commonly owned, co-pending U.S. patent application Ser. No. 11/585,047 filed Oct. 23, 2006 entitled Method and Communication Device for Routing Unicast and Multicast Messages in an Ad-hoc Wireless Network (the "'047 Application").

FIELD OF THE INVENTION

The present invention relates to a communications network in a mobile environment. More specifically, the invention relates to a local peer group, a wireless communications device, a program and a method for adaptively controlling the local peer group and wireless communications device based upon local environmental and network conditions.

BACKGROUND

Mobile ad-hoc networks have become increasingly important in areas where deployment of communication infrastructure is difficult. A mobile ad-hoc network (MANET) is formed by multiple moving nodes equipped with wireless transceivers. The mobile nodes communicate with each other through multi-hop wireless links. Each node equipped with a wireless transmission can transmit and receive information.

One type of MANET is a vehicular ad-hoc network (VA-NET) that refers to a mobile ad-hoc network designed to provide communications among nearby vehicles and between vehicles and nearby fixed equipment. Key performance requirements include low latency (on the order of 100 milli-seconds) and sustained throughput (or equivalently, the percentage of neighboring vehicles that successfully receive warning messages) in order to support various applications such as collision avoidance. For example, information that is necessary for setting up safety communications must be exchanged in real-time, and vehicles in the groups must configure themselves in real-time so that safety communication can take place. The high mobility of uncoordinated vehicles implies frequent change of neighbors or vehicle groups, and poses difficulties of using support-servers (for mobility, address, name, media session) within vehicle groups. These key differences make existing mobile ad-hoc networking technologies (designed for other application such as tactical ad-hoc communications) not directly applicable to vehicle groups.

The '047 application describes a method for organizing groups of moving vehicles into a Local Peer Group (LPG) by selecting one moving vehicle as a group header and generating local routing information. The LPG is formed by transmission of control messages such as heartbeats (HB) and membership reports (MR). The HB message has been implemented using flooding mechanisms.

In a VANET the variance in local environmental conditions and the change in performance of each wireless communication device due to the variance of the local environmental conditions are aggregated and the performance of an LPG is significantly affected.

Therefore, a group header node must be able to adjust LPG structural and operating parameters based upon the change in local environmental conditions.

SUMMARY OF THE INVENTION

Accordingly, disclosed is a method for dynamically maintaining a local peer group (LPG). The local peer group is formed from a plurality of moving vehicles. Each moving vehicle is equipped with a wireless communications device. One of the plurality of moving vehicles is initially selected as a group header node (GH) from the LPG. The method comprises receiving periodically a heartbeat (HB) packet from the group header, forwarding the heartbeat packet until a maximum relay hop count is reached after waiting for a first random relay delay, replying to the heartbeat packet with a membership report packet, forwarding a membership report (MR) packet towards the GH and adding a moving vehicle that submitted the membership report packet to a LPG membership as a member node of the LPG if the membership report packet is new or updating information for a member node already listed in the LPG membership.

The heartbeat packet includes at least the maximum relay hop count and a heartbeat cycle period. A subset of the heartbeat packets includes a complete membership list. The number of heartbeat packets in the subset is adjustable. The heartbeat cycle period is adjustable based on a number of membership changes detected by the GH. The maximum relay hop count is also adjustable.

The first random relay delay is set to be less than a maximum allowable adjustable value. The maximum allowable adjustable value is determined by the GH. The forwarding of the membership report packet is delayed by a second random delay. The second random delay is based upon the same maximum allowable adjustable value.

A new GH is selected if a heartbeat packet is not received within period of time. The period of time is adjustable.

A member node is deleted from a membership list maintained by the GH, if a membership report packet is not received from the member node with a second period of time. The second period of time is adjustable and is a multiple of the heartbeat cycle period.

The membership report includes an identifier of an originating moving vehicle, a list of members of the LPG which are reachable via the originating moving vehicle, and a hop count from the GH. The membership report is initially broadcasted after a third delay. The third delay is calculated by the originating moving vehicle. The third delay is calculated based upon a wait period and the maximum allowable delay. The wait period is determined by an order of an identifier of relaying moving vehicle in a membership list in the heartbeat packet.

The method further includes controlling a time of each adjustment or modification.

The heartbeat packet can include vehicle information corresponding to the moving vehicle of the group header and performance information, and each membership report can include vehicle information corresponding to the moving vehicle of the group node and performance information. The vehicle information includes make and model of the vehicle, speed, direction of travel and position and performance information includes number of packets send, relayed and received. Each of the adjustments can be based upon the vehicle information and performance information.

The group header determines the maximum relay hop count by determining a number of moving vehicles at each hop within the local peer group based upon the vehicle information.

The group header uses the number of moving vehicles at each hop and said maximum relay hop count to determine the maximum allowable adjustable value.

The group header uses the number of moving vehicles at each hop and said maximum relay hop count to determine the adjustable heartbeat cycle period. The adjustable heartbeat cycle period is based upon a time needed to forward the heartbeat packet to moving vehicles at the maximum relay hop count, broadcast a membership report packet and forward a membership report packet to the group header from moving vehicles at the maximum relay hop count and a time reserved for new moving vehicles that are not already member nodes of the local peer group.

Also disclosed is a program containing instructions for executing the above-identified methods. The program is stored in a computer readable medium.

BRIEF DESCRIPTION OF THE DRAWINGS

These and other features, benefits, and advantages of the present invention will become apparent by reference to the following figures, with like reference numbers referring to like structures across the views, wherein:

FIG. 3 illustrates a sample format for a heartbeat;

FIG. 10 illustrates a flow diagram of a method for adjusting the HB and MR wait time according to the invention.

DETAILED DESCRIPTION OF THE INVENTION

An "equipped vehicle" is a moving vehicle with a wireless communication device.

A "Node" is a router which implements the routing protocol or method as specified in the following description. For example, an equipped vehicle is a node. For the purposes of this application, a node and equipped vehicle are interchangeably used.

A "neighbor node" means that there is a direct wireless link between two nodes. A node X is a neighbor node of node Y if node Y can hear node X and node X can hear node Y.

A "neighborhood" means all nodes within one hop of each other.

A "hop" is a number of nodes in which a message is relayed. The hop count for a neighboring node is 1.

Figure 1:
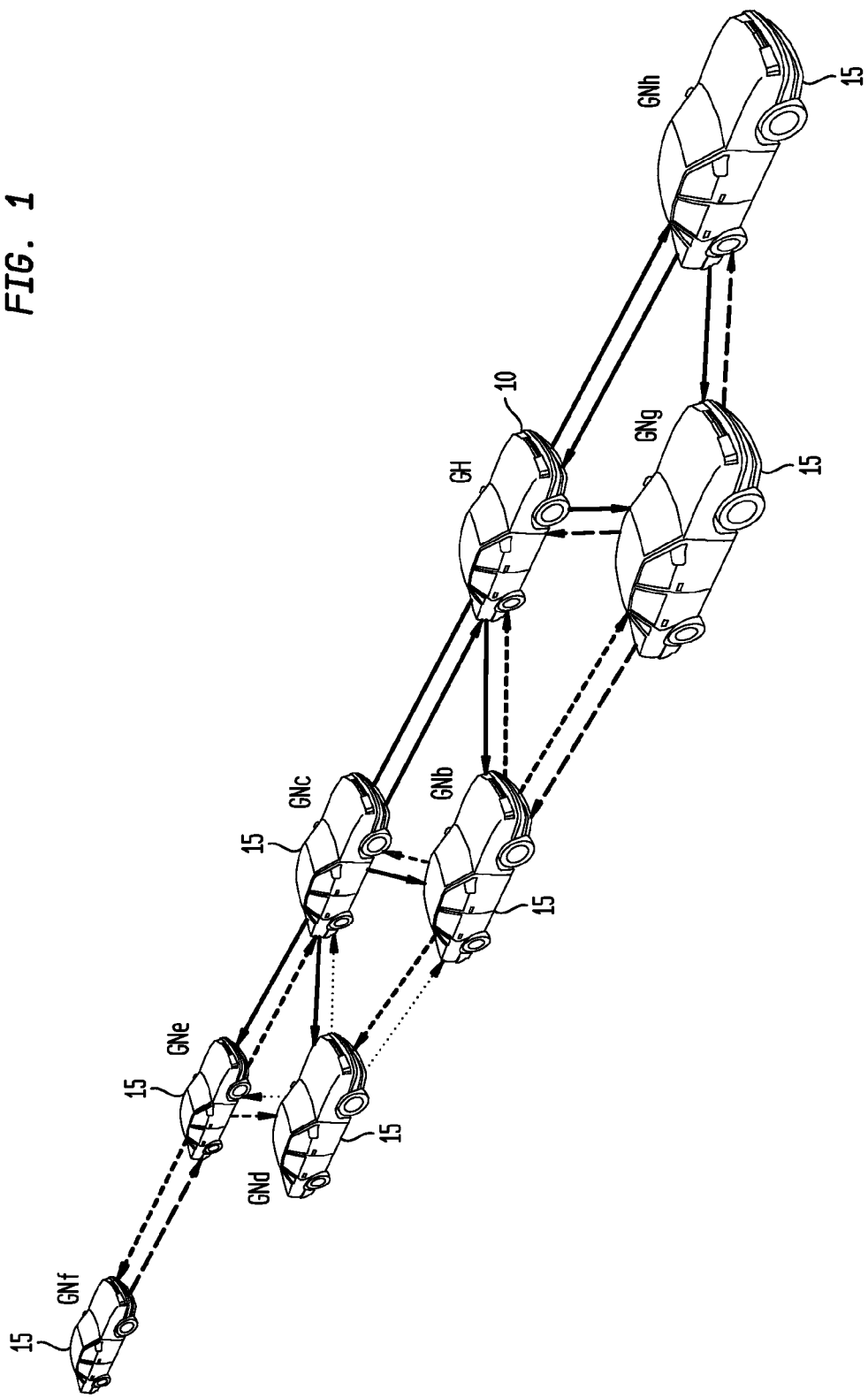
FIG. 1 illustrates an exemplary local peer group with one group header node and multiple group members in accordance with the invention.

FIG. 1 illustrates an example of a local peer group ("LPG" 1) in accordance with the invention. The LPG 1 forms an ad-hoc network. Equipped vehicles can be organized into manageable groups. These groups are used to coordinate transmission of data between nodes of ad-hoc network. The groups are built based upon the relative location of neighboring nodes or based upon a fixed location. The LPG 1 is the basis for routing radio signals within a single LPG, as well as between multiple LPGs.

The size of a LPG 1 is controlled to avoid too many nodes in a given LPG 1. Specifically, one equipped vehicle is selected as a group header node or GH (referenced as GH 10 in FIG. 1) broadcasts a radio signal having a specific format, e.g., a heartbeat 300, other equipped vehicles within the range of the GH 10 have the ability to receive the radio signal. The heartbeat is described in FIG. 3. The radio signal includes a hop count or a Time-to-live (TTL) value in which the signal is valid, i.e., if the signal is relayed for a hop count greater than the specified value, the node will not join the LPG 1 or is deleted from the LPG 1 as a group node of the LPG 1 (hereinafter a group node is referred to a GN 15). This radio signal is called a heartbeat 300. The heartbeat 300 is periodically broadcasted. The period is a heartbeat cycle. This heartbeat cycle is dynamically adjustable based upon current environmental conditions and number of equipped vehicles, e.g., GNs 15 in the LPG 1. When the heartbeat cycle is increased, the frequency of the heartbeat 10 is decreased, and vice versa.

The formation and selection of a GH and control of an LPG 1 is described in the '047 Application which is hereby incorporated by reference. FIG. 1 illustrates an LPG 1 with eight nodes, one GH 10 and seven GNs 15 (GNb-GNh). In another embodiment, an LPG 1 can include a roadside unit. The roadside unit can relay data between equipped vehicles or between equipped vehicles and a backbone device. Additionally, the roadside unit can broadcast information related to the local environment such as roadway information, traffic conditions, speed limits, etc. In FIG. 1, GNc, GNb, GNg and GNh are one-hop from GH 10. GNd and GNe are two-hops from GH 10. GNf is three-hops from GH 10.

A GH 10 can control the size of an LPG 1 by increasing or decreasing the maximum hop count 345 for a heartbeat 300. The maximum hop count 345 is included in the heartbeat 300.

A selection of the GH 10 is dynamic. The equipped vehicle that is the GH 10 changes over time, depending on whether a heartbeat 300 (which will be described in detail later) is received by all GNs 15 within the LPG 1, within a variable HB wait time 340. The GH 10 periodically sends out a heartbeat to maintain the LPG 1. GNs 15 will set a timer to wait for the next heartbeat 300. The timer is equal to a multiple of the heartbeat cycle. The HB wait time 340 is included in the most recent heartbeat 300. The wait time is adjusted by the GH 10. This HB wait time 340 is determined based upon current environment conditions.

When a GN 15 receives the heartbeat 300 (i.e., within the radio range of the GH 10), it will reset a time to wait for the next heartbeat 300. If the heartbeat 300 is not received within the HB wait time 340, then one of the GNs 15 that did not receive the heartbeat 300 takes over the GH functions for the LPG 1. The header resolution procedure is used among competing GHs to select the winning GH.

A GH 10 maintains a list of all GNs 15 within the LPG 1. In an embodiment, the list is ordered or sequenced by the hop-count from GH and node identifier. GNs 15 within the same hop-count are ordered by node identifier. When a GN 15 receives the heartbeat 300, the GN broadcasts a membership report 400 ("MR") after a delay which is equal to a defined waiting period plus a random delay. The wait period is calculated by the GN 15. The random delay is assigned based upon a maximum allowable delay 350. The GN 15 assigns the random delay between 0 and the maximum allowable delay 350. The maximum allowable delay 350 is included in the heartbeat 300. The MR 400 is relayed to the GH 10. If the GH 10 does not receive a MR 400 within a wait time (MR wait time), the GH deletes the GN corresponding to the MR from the list. The wait time is a multiple of the heartbeat cycle. The MR wait time is dynamically adjustable based upon the current environment conditions and stability of the LPG. The heartbeat 300 is forwarded by each GN 15, one-hop at a time. Similarly the MR 400 is broadcast and relayed one-hop at a time.

Each forwarding, broadcasting and relaying occurs after a delay and/or a wait period. The delay and/or wait period prevents two equipped vehicles in the same neighborhood from broadcast packets at the same time, i.e., collision. The delays are determined by the forwarding, broadcasting and relaying node, e.g., GNs 15. The delays are adjustable. The GH determines a maximum allowable delay 350. The forwarding, broadcasting and relaying delays are determined by the nodes and must be less than the maximum delay. Each of the delays includes a random delay component. The forwarding and relay delays are random delays that are selected to be less than the maximum allowable delay 350. The broadcasting delay is a function of the max hop count 345, number of nodes and the maximum allowable delay 350.

Figure 2:
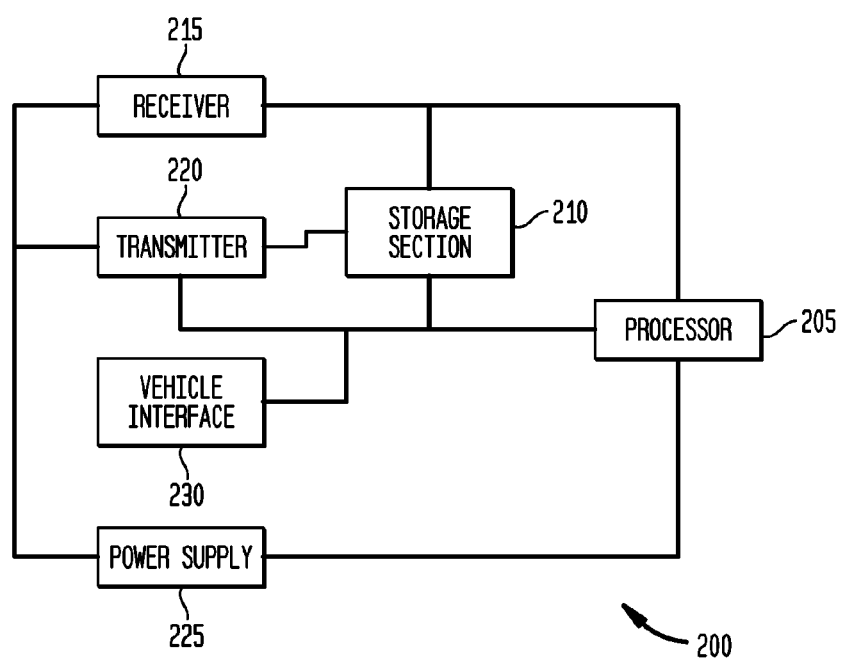
FIG. 2 illustrates an exemplary wireless communications device installed in a vehicle in accordance with the invention.

FIG. 2 illustrates an exemplary wireless communication device 200 in accordance with the invention.

An equipped vehicle includes the communications device 200 which can be attached to, embedded in or used in combination with the moving vehicle.

The communications device 200 includes a computing device or processor 205, a storage section 210, a receiver 215, a transmitter 220, a power source 225 and a vehicle interface 230. The receiver 215 and transmitter 220 are for providing wireless communication between nodes (include the roadside unit) in a radio coverage range. While the receiver 215 and transmitter 220 have been illustrated in as two separate elements, the receiver 215 and transmitter 220 can be incorporated together as a transceiver.

The processor 205 can be any type of control device such as, but not limited to, a microcontroller, a microprocessor, ASIC, FPGA or other logic device. The processor 205 provides operational control by executing instructions, which have been programmed. A storage section 210 is electrically coupled to the processor 205 and is in operational communication with the processor 205. The storage section 210 may be memory modules, removable media or a combination of multiple storage devices, etc., and is configured to store the processor-executable instructions necessary for the performance of the methods and protocols described herein. The storage section 210 can include a priori roadway information, vehicle information and network topology infatuation. The information regarding the roadway could be obtained from road maps and GPS coordination. The programming can occur during installation or periodically downloaded from a home personal computer.

The processor 205 includes at least one timing section. Alternatively, the timing section can be a separate component. The timing section provides the time interval tracking necessary for each of the timers referred to in the described embodiments, such as, but not limited to heartbeat cycle, HB wait time 340, MR wait time, forwarding, broadcast and relay delay time.

The communications device 200 can also include a location determining section (not shown) such as a GPS device. Alternatively, the location determining section can be external such as one located in the equipped vehicle and the location information transmitted to the communications device 200 through a vehicle interface 230. Additionally, other location information such as a compass direction and speed can also be transmitted to the communications device 200 from the equipped vehicle via the vehicle interface 230. In an embodiment, the direction and speed can be estimated based upon a previous position estimation and time between estimations.

A power source 225 is electrically connected to all the components of the communications device 200 for providing operational power to the components as necessary. The communications device 200 further includes an internal clock that maintains a clock for the device and is used as the timestamp for all messages.

The processor-executable instructions for performing the described embodiments may be embedded in the storage section 210 in a form such as an EPROM, Flash memory or other such non-volatile storage. Additionally, the processor-executable instructions may be stored on a computer readable media such as an optical or magnetic medium. Preferably, a user or a maintenance staff at a dealership, as necessary, can periodically update the processor-executable instructions in order to provide additional enhancements to the network as they become available.

Each communications device 200 is assigned a unique identifier to facilitate the transmission and reception of messages over the ad-hoc network. The unique identifier can be any number that is uniquely assigned to the communications device 200 so that no device within a specific area has the same unique identifier. This identifier must be assigned quickly to support immediate communication, if necessary. The unique identifier can be any unique number or address that facilitates communication, such as a MAC address, VIN number or IP address, the identifier is used as the node's identifier. Any equipped vehicle with the communications device 200 can be a node of a vehicular ad-hoc network.

FIG. 3 illustrates an example of the format for the heartbeat 300. The heartbeat 300 includes a unique identifier that includes both a LPG identifier or GID 305 and the Group Header ID 310. The group header ID 310 is the identifier for the GH.

A GID 305 and the Group Header ID 310 identify each LPG 1. There are several possible formats for the GID 305. In an embodiment, the GID 305 can be an identification number randomly selected for the LPG 1. Alternatively, the GID 305 can be an identification number assigned based upon an order of formation of the LPG. For example, the first LPG can have the GID 305 of LPG 1; the second would be LPG 2 and so on. However, as the GH changes, the GID 305 would change as well, and would result in a node not being able to tell if its LPG changes or just the ID for the LPG 1. On the other hand, the GID 305 can be fixed to the original ID when a GH 10 leaves. However, this might lead to GID 305 duplication when a single LPG splits. Two or more groups will have the same GID 305. In an embodiment the GID 305 is encoded based upon both LPG ID and GH ID numbers to uniquely identify the LPG 1.

A GH is given a Group Header ID 310. Initially, the GID 305 is tied to the Group Header ID 310. Therefore, the Group Header ID 310 initially is used as a portion of the GID 305, but as the GH changes, the GID 305 changes to include the new Group Header ID 310. Each GH is assigned a Group Header ID 310. The Group Header ID 310 is assigned based upon an (public or private) IP address. As depicted in FIG. 3, the Group Header ID 310 is an IPv6 IP address. In another embodiment, the Group Header ID 310 can be an IPv4 address.

The heartbeat 300 also includes a sequence number (Seq. No.) 315. The Seq. No. 315 is used to track the order of the heartbeat to determine if a received heartbeat control message 300 is new or fresh. A GN 15 remembers the Seq. No 315 of the received heartbeat 300. A new or fresh heartbeat 300 is indicated by a first heartbeat with the next Seq. No. 315. The sequence number 315 is also used to determine which heartbeat 300 should be relayed (to the next hop nodes), i.e., a first come relay only (FCRO) strategy can be used. Only new (i.e., fresh) heartbeat 300 should be relayed. A node remembers the previous sequence number and then compares the incoming sequence number of the heartbeat to determine if the heartbeat is new or fresh. If the Seq. No. 315 of the heartbeat 300 with the proper GID 305 is greater than the currently stored sequence number, it is a new or fresh heartbeat 300 and is then relayed when FCRO is used. The sequence number previously stored in the GN 15 will be discarded and replaced with the new Seq. No.

The heartbeat 300 further includes information regarding the heartbeat cycle (HB period) 320. In this application, the HB period and heartbeat cycle is interchangeably used. This period is an adjustable interval (T). The adjustment will be detailed later in greater detail. The HB period 320 indicates to all GNs when the next heartbeat 300 will be broadcast. If a GN 15 does not receive a heartbeat control message within the HB wait time 340, the GN 15 will transmit a new heartbeat such that a heartbeat is continuously transmitted. The HB wait time 340 is also included in the heartbeat.

If the original GH is still in the LPG 1, then header resolution will occur. To reduce the control overhead, the GH can adjust the HB period 320. The adjustment can be based upon size of the LPG, location, load, speed and number of nodes within the LPG.

The heartbeat 300 will also include the type of heartbeat 325, e.g., heartbeat with complete group list 335, incremental group list or no group list. The frequency that a complete group list is disseminated by the GH 10 is dynamically adjustable. In one embodiment, the heartbeat 300 will include a complete group list in every message. Using a complete group list is the most accurate way to control routing and maintain a correct list of group members; however, there is a significant amount of bandwidth needed for the heartbeat 300 with a complete group. Every n-th heartbeat 300 includes a complete group list, where n is adjustable. For example, each third heartbeat includes a complete group list. This will reduce the bandwidth for the average heartbeat control message. However, since most of the nodes within the LPG 1 are moving at a rapid pace, the received group list might be stale. In other words, by the time the new group list is received by a node, several members of the group might be in another LPG 1. In another embodiment, a progressive or incremental group list can be distributed. A group list will only be distributed when there is a change in the membership in the group list.

Alternatively, the type of heartbeat 300 can be a hybrid group list update. A progressive group list can be included in the heartbeat 300 when there is a change in membership and additionally a complete group list can be included every n-th heartbeat. ToHb 325 will indicate the type of heartbeat. The type of heartbeat is influenced by the topology change rate of the LPG 1 and frequency of broadcast of the heartbeat 300. As the topology change rate of an LPG 1 increases, there is a greater need for a complete group list being included in all heartbeat. As the frequency of broadcast of the heartbeat 300 increases, the need for a complete group lists being included in all heartbeats decreases. The frequency of the complete membership list is based upon the network topology such as a change ratio (stability). When the topology is stable, an incremental list is used instead of a complete list. The overhead is reduced. When there are new GNs 15, a complete list is used.

The heartbeat 300 includes the hop count (HC) 330 from the GH. Initially, the HC 330 is set at a predetermined value, e.g., 1. Every time the heartbeat control message is relayed by a node, the relay node (GN 15) increases the HC 330 value by 1, i.e., HC=HC+1. The HC value 330 is used to limit the LPG size, to indicate the staleness of the information within the heartbeat and to control routing of the control messages to reduce overhead. For each LPG 1, there is a maximum hop count for routing, e.g. 10 (max hop count 345). For purposes of this description maximum hop count and max hop count is the same. Once the HC is incremented to the maximum hop count 345, the control message, e.g., the heartbeat 300 will not be relayed. The adjustment to the maximum hop count 345 will be described in detail later. The maximum hop count 345 is also included in the heartbeat.

When a node forwards the heartbeat 300 it will include its ID information in the message so that next hop nodes know who relayed the heartbeat 300. The node forwarding the message also then becomes the MR relay node (to send the MR towards the GH) for next hop nodes, which received the heartbeat 300 for the first time from the node.

The usage of a maximum hop count 345, HC 330 and Seq. No. 315 prevent the infinite duplications of flooding of the control message within the LPG 1. According to one embodiment of the present invention, when a node overhears a flooding relay whose hop count (HC) from the flooding source is smaller than its own, the node gives up relaying the flooding message.

Additionally, the heartbeat 300 includes a maximum allowable delay 350. The maximum delay is the maximum available delay for forwarding the heartbeat, broadcasting of the MR 400 and relaying the MR to the GH 10. The maximum allowable delay 350 is used by the GN 15 to assign a random delay for each packet (random component for the delay for the broadcasting).

Generally, a heartbeat 300 triggers a Membership Report (MR) 400 from a node. The contents of the MR 400 are described in FIG. 4. Whenever a node relays an MR, the node stores the most recent sequence number of the MR 405 (corresponding to the Seq. No. 315 of the BR), duplicates the MR, replaces the next hop, and broadcasts the MR. A subsequent heartbeat 300 is received and the Seq. No. 315 is compared to the stored Seq. No. of the MR. Since the delivery of the MR automatically selects relay Nodes (as described in the '047 application), comparing sequence numbers ensures that only selected Relay Nodes deploy subsequent HB, thus reducing the amount of unnecessary control messages during HB flooding.

As set forth above, a heartbeat 300 includes a Group List 335. A Group List 335 can include information regarding the members of the LPG 1, such as the number of members in the LPG 1, IP addresses for each member, the hop count from the GH, and a classification.

A classification can be a code that references a relative direction from the GH node, e.g., uplink, downlink and peer. A peer classification indicates that a node is within the same wireless coverage area from the GH, i.e., all of the peer nodes have the same hop count from the GH. Upstream nodes are determined by the heartbeat control message. Downstream nodes are determined based upon a membership report (MR). Upstream transmission represents communication towards the GH and downstream transmission represents communication away from the GH. This classification is a relative term. Each GN 15 can classify its neighbors into three different classes. If the membership report of another GN has 1 less hop count (HC) than the HC of the GN, the GN is an upstream node. If the HC is the same with its own HC, the GN is a peer. If the HC is 1 greater than its own HC, the GN is a downstream node.

Figure 4:
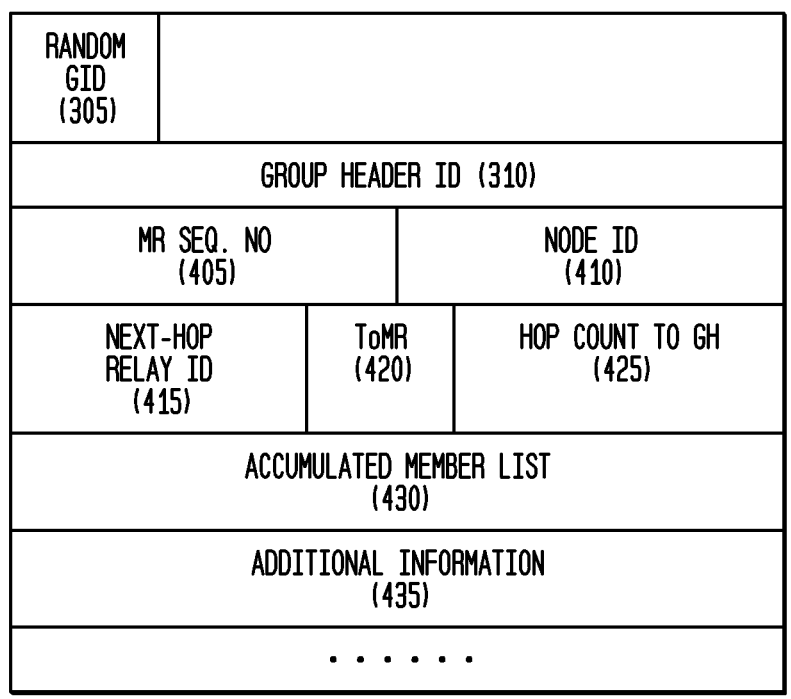
FIG. 4 illustrates a sample format for a membership report.

FIG. 4 illustrates a membership report (MR) 400. An MR 400 is a control message broadcast by the GN 15 for receipt by the GH 10. The MR 400 includes collectable routing information such as a membership list (member list 430), and downstream node identifications. Not all MRs 400 include the membership list. The frequency of including the membership list 430 is adjustable based upon the stability of the LPG 1 and number of nodes, GNs 15 and GH 10. In an embodiment, the MR 400 includes an accumulated partial membership list having a subset of the downstream node identifications. Instead of relaying MR 400 back to GH 10, the node accumulates the downstream member's MR which will be included in its own. MR. An MR 400 includes some of the same information as the heartbeat 300: the GID 305 and the Group Header Id 310. The MR 400 will also include an MR Seq. No 405. The MR Seq. No. 405 is similar to the Seq. No 315 for the heartbeat 300 and is used to maintain order of the MR's. The MR. Seq. No. 405 is the MR order for one node. Typically, the MR Seq. No. 405 has the same value with the Seq. No. 315 of the heartbeat 300 that triggered the MR 400.

The Node ID 410 of the originating node is also included in the MR 400, i.e., node that generated the MR. The MR 400 also includes Next-hop relay ID 415. The Next-hop relay ID 415 is relay instructions for the MR 400 towards the GH. The next hop information is determined directly from the received heartbeat 300. When a node receives a new or fresh heartbeat 300, it recovers the previous relaying node's identification from an IP layer and MAC layer before any message processing. The previous relaying node's identification is stored in memory and used as the Next-hop relay ID 415 for the MR 400. When a node forwards a heartbeat, the node includes its ID in the message. The receiving next hop node will store this ID when the node receives a new or fresh heartbeat, as the next hop relay ID to reach the GH 10. A new or fresh heartbeat 300 is the one that has a newer sequence number with lowest HC.

The MR 400 also includes a "Type of MR indicator" ToMR 420. There are two types of MRs: a single member and aggregated multiple member report. A single member MR only includes an MR 400 from the originating node. An aggregated multiple member report includes the MR 400 of more than one node. The aggregate report can be used to reduce the overhead and bandwidth needed for control messages. One MR is sent containing multiple MRs.

Additionally, the MR 400 can include a Hop count from the GH ($HC_{GH}$) 425. ($HC_{GH}$) 425 is the HC value from the GH to the originating node of the MR. In another embodiment, the MR can include an accumulated membership list 430 and other additional information 435. The accumulated membership list 430 will include the IP address of the member of the LPG, number of members and corresponding hop counts.

The MR 400 can be delivered or relayed to the GH 10 using a reverse path or reverse flooding method. A reverse path method relays the MR 400 towards the GH 10 using the same path that was used for relaying the heartbeat 300. When an MR 400 is relayed, the relaying node replaces the Next-Hop Relay 415 with its next hop towards the GH 10. Only the node that has the corresponding ID relays the MR 400. This method assumes symmetry in transmission. If asymmetry links are present, the Reverse flooding method is used, i.e. every node between the originating node and the GH 10 relays the MR 400.

The adjustments to the various times, maximum hop count 345 and membership lists, the LPG 1 can respond to the channel performance, environmental changes and number of nodes, e.g., GH 10 and GNs 15. Each adjustment or change is inter-related. For example, the adjustment of the maximum allowable delay 350 is related to maximum hop count 345. An increase in the maximum hop count 345 results in an increase in the number of vehicles in an LPG 1 which might decrease the maximum allowable delay 350 or increase the heartbeat cycle. The GH 10 controls the adjustments, except that the GH 10 dictates the maximum allowable delay 350 and the GNs 15 individually determine their own delay based upon the heartbeat cycle and the maximum allowable delay 350.

The GH 10 controls the maximum hop count 345 (max HC) to maintain a proper size of LPG 1. When there is a traffic congestion, the number of equipped vehicles, e.g., GNs 15 within a radio coverage, i.e., number of nodes within the LPG 1, can be larger (a dense network) than the number of equipped vehicles in a normal traffic situation. In this case, the maximum hop-count, which controls the size of LPG 1 should be smaller, i.e., reduce maximum HC 345 in the heartbeat 300.

Just prior to the expiration of the heartbeat cycle, GH 10 monitors the number of members (number of GNs 15) in LPG 1 and if the number is too large, reduces the maximum hop count 345 to make the size of LPG 1 smaller. On the other hand, when the number of member is too small, GH 10 increases the LPG 1 coverage by increasing maximum HC 345 in the HB. The change in the maximum hop count 345 is triggered by a change in the number of GNs 15 in the LPG 1 and a change in the heartbeat cycle. However, a significant change in the size of the LPG can cause instability in the vehicular ad-hoc network.

The heartbeat cycle is controlled to allow the heartbeat 300 to be forwarded to the maximum number of hop (maximum hop count 345) and the MR 400 relayed to the GH 15 from GNs at the maximum hop count 345. The heartbeat cycle is changed based upon the network topology such as a change ratio. A change ratio is the number of new GNs 15 in the LPG 1 within a period of time. If no new GNs 15 join the LPG 1, a longer heartbeat cycle is used. On the other hand, if the change ratio indicates that many new GNs 15 have joined the LPG 1, a shorter heartbeat cycle is used. The minimum and maximum allowable heartbeat cycles are adjusted based upon a balance between overhead control packets and the staleness of information. Within the minimum and maximum allowable heartbeat cycles, the actual heartbeat cycle is determined to accommodate the forwarding and relaying of the heartbeat 300 and MR 400. The time needed will be based upon the forwarding, broadcasting and relaying delay. The GH 10 selects a heartbeat cycle to reduce the overhead.

The heartbeat and MR wait time is controlled to minimize any deletion of GNs that are still within the LPG 1 and a selection of a second GH when the original GH 10 is still present. Missing a broadcast heartbeat 300 or MR 400 will cause unnecessary new LPGs and GN 15 departure. These "faulty" changes results in unstable operation of LPG 1 and the result can be devastating. A faulty GN 15 departure occurs when a GH 10 does not receive an MR 400 within MR wait time and the member who is responsible for the MR 400 is still within the LPG 1. When the GN 15 does not receive a heartbeat from a GH 10 for the heartbeat (HB) wait time 340 and GH 10 resides in the LPG coverage, a faulty GH is selected.

HB and MR wait time control stabilizes the structure. The control assigns a longer wait-timer when there are faulty membership changes observed. When there are faulty member departures, the MR wait time becomes longer. When there are faulty GH creations, a longer heartbeat wait time is used.

The GH 10 also considers the ability to disseminate topology changes. Longer wait timers result in slower learning of topology changes. If the wait times are too long, it takes long time to detect actual member departure (i.e. if the MR wait time is long, GH 10 can detect GN departure after the wait time in worst case and if the heartbeat wait time 340 is long, GN 15 can detect the departure from its old LPG after the wait time when it goes to no-LPG area or LPG with lower priority.).

The maximum allowable delay 350 for the forwarding, broadcasting and relaying is determined based upon the size of the LPG maximum hop count 345 and number of GNs in each hop, MAC performance and service quality needed and the heartbeat cycle. The delay is calculated based upon the collected membership information from the GNs 15.

The maximum allowable delay 350 is also dynamically adjustable. The delay adjustment is triggered by a low heartbeat 300 and MR 400 delivery rate. The overall delay is a sum of the forwarding, broadcasting and relaying delay. A forward delay is the delay until a GN 15 relays the heartbeat 300. The broadcasting delay is the delay until a GN 15 sends a MR 400. The relaying delay is the delay until a GN 15 relays the MR 400.

The GH 10 estimates the time it takes for the heartbeat 300 and MR 400 to be relayed to the maximum hop count 345 without delay. The estimate is compared with the heartbeat cycle and the leftover amount is equally allocated. If the estimation is larger than the maximum allowable heartbeat cycle, either the cycle is increased or the maximum hop count 345 is decreased. The GH 10 equally divides the heartbeat cycle into two times, one for the heartbeat 300 and other for MR 400.

The necessary heartbeat cycle (N_Hbcycle) is calculated based upon the following formula:

$$N\_HBcycle = (m+1)*HBtxTime + [m+p2 + 2*p3 + \ldots + (n-1)pn]*MRtxTime + Zeta \quad (1)$$

N_HBcycle is the sub-optimal heartbeat cycle that heartbeat 300/MR 400 exchanges without collision when those transmissions are well coordinated can be delivered to all nodes within the LPG 1.

HBtxTime represents time required to send (or forward) a heartbeat 300, m is the number of GNs 15 in LPG 1, n is the maximum hop count 345, pi is the number of GNs 15 in i-hop from GH where $1 \leq i \leq n$ and $m = p1 + p2 + \ldots + pn$.

m+1 separate broadcasts are needed to distribute a heartbeat 300. MRtxTime represents time required to send (or relay) an MR 400, and $m + p2 + 2*p3 + \ldots + (n-1)pn$ transmissions of MRs 400 are necessary from distribute the MR. Zeta is a time that is reserved for HB/MR separation, new members, possible topology changes and unexpected laggings including channel waiting time.

The maximum delay (MaxARD) per each control packet transmission is calculated using the following formula:

$$MaxARD = (HBcycle - N\_HBcycle)/\#CtrlPkt, \quad (2)$$

where heartbeat cycle is the current heartbeat cycle and N_Hbcycle is defined by the formula (1) and #CtrlPkt is the total number of control packets that require the delay. The maximum delay is determines to be equal for each control packet. If HB cycle$-(HB_{duration} + MR_{duration} + zeta)$ is negative, the heartbeat cycle is increased or the maximum hop count 345 is decreased. If HB cycle$-(HB_{duration} + MR_{duration} + zeta)$ is close to HB cycle, the heartbeat cycle is decreased or duration the maximum hop count 345 is increased.

Figure 5:
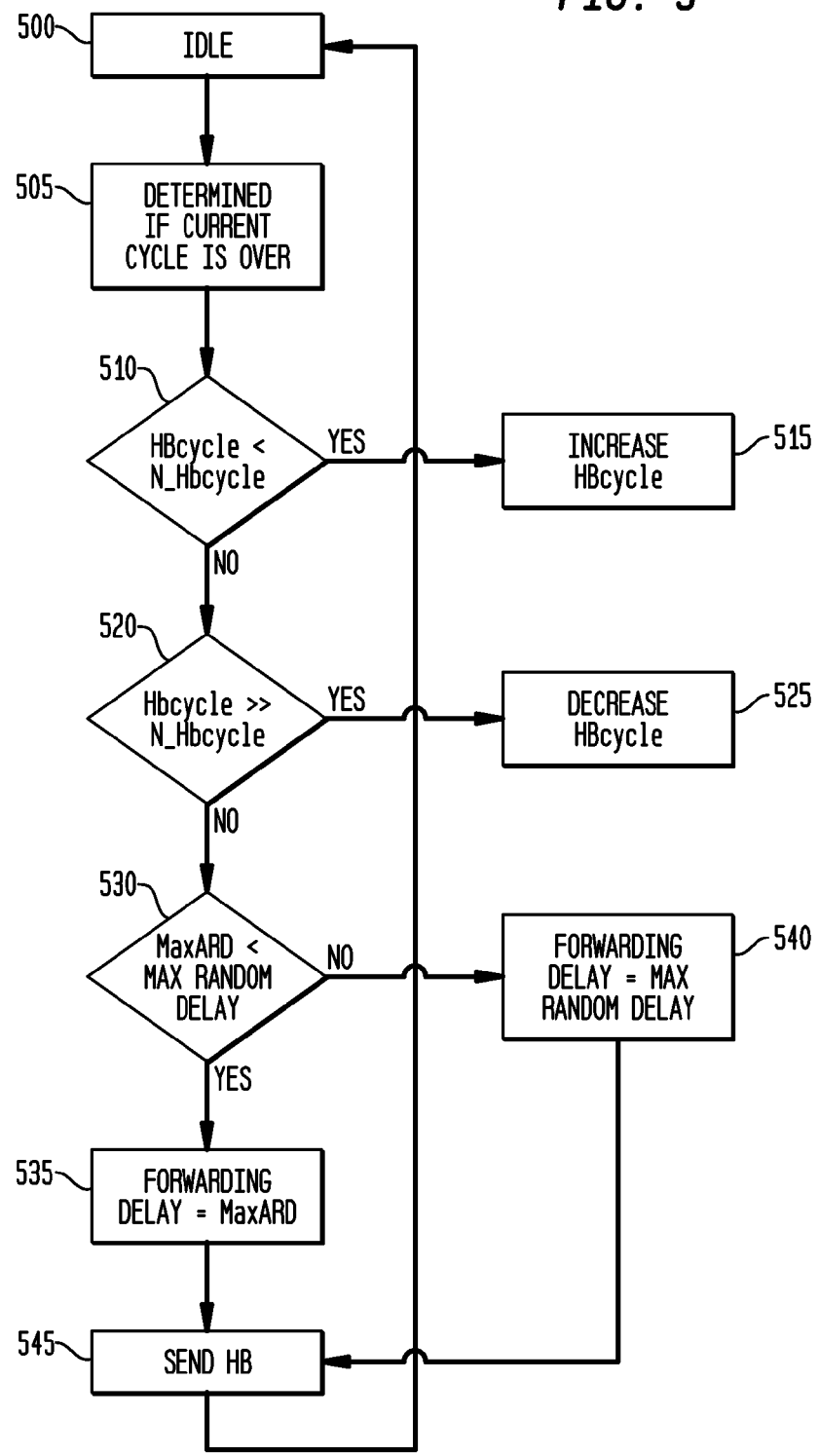
FIG. 5 illustrates a flow diagram of a method of determining a maximum allowable delay by the group header node according to the invention.

FIG. 5 illustrates a flow diagram of a method of controlling the delay at the GH 10 according to the invention. The method begins at step 500. The GH 10 is idle. A timer is counting the heartbeat cycle time (HBcycle). At step 505, the GH 10 determines if the current heartbeat cycle is over, i.e., HBcycle=0.

Prior to a new heartbeat cycle, the GH 10 estimates the N_HBcycle based upon the formula identified above. At steps 510 and 520, the GH 10 compares the previous heartbeat cycle with the N_HBcycle. At step 510, if the previous heartbeat cycle is smaller than N_HBcycle, the GH 10 increases the heartbeat cycle (step 515-heartbeat cycle control), i.e., process goes to step 725. The heartbeat cycle control will be described later. At step 520, if the previous heartbeat cycle is substantially larger than N_HBcycle, the GH 10 determines if the heartbeat cycle control is needed, i.e., step 525 (decrease the cycle), i.e., process goes to step 715. If the previous cycle is larger than N_HBcycle and not substantially larger, than the GH 10 calculates the maximum allowable delay (MaxARD) based upon the above formula. At step 530, the GH 10 compares the calculated MaxARD with a maximum delay threshold (referenced as "Max Random Delay"). The maximum delay threshold is a parameter that prevents excessively long delays. The maximum delay threshold is dynamically adjustable. The value of Max Random delay is based upon currently detected environmental conditions such as, but not limited to, the current heartbeat cycle, number of nodes in the LPG 1 and the topology change ratio. The Max Random delay is small percentage of the heartbeat cycle. The actual maximum allowable delay, which is included in the heartbeat 300, i.e., maximum allowable delay 350, is determined based upon a comparison with the Max delay threshold, at step 530. If MaxARD is less than Max Random Delay, then the maximum allowable delay 350 is assigned the MaxARD value at step 535. In FIG. 5 the maximum allowable delay 350 is referenced as the forwarding delay. The actual forwarding delay for each GN 15 is based upon the maximum allowable delay 350. Alternatively, if MaxARD is not less than Max Random Delay, then the forwarding delay (maximum allowable delay 350) is assigned the Max Random Delay value at step 540. At step 545, the GH 10 broadcasts the heartbeat 300 with the maximum allowable delay 350.

Figure 6:
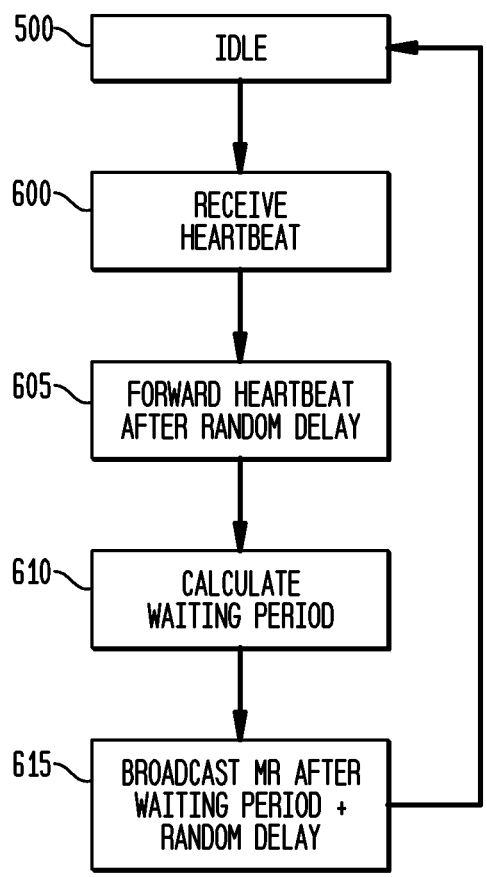
FIG. 6 illustrates a flow diagram of a method of calculating a broadcasting delay for a membership report by a group member according to an embodiment of the invention.

FIG. 6 illustrates a flow chart for a control method at the GN to forward the heartbeat 300 and broadcast the MR 400. A GN 15 begins in an idle state 500. The GN 15 waits for the heartbeat 300. At step 600, the GN 15 receives the heartbeat 600. When the heartbeat is received, the GN 15 extracts the information from the heartbeat 300 and stores the information in the storage section 210. The GN 15 forwards, the heartbeat 300 after delay at step 605. The GN 15 selects a random delay between 0 and the maximum allowable delay 350. The maximum allowable delay 350 is determined directly from the heartbeat 300.

At step 610, the GN 15 calculates the waiting period for the broadcast delay. The GN 15 uses the maximum hop count 345, the current hop count and the membership list to calculate the waiting period. The waiting period is determined based upon the time needed to complete the distribution of the heartbeat 300 to the maximum hop count 345, e.g., current hop count is the number of remaining hops needed to deliver the heartbeat 300 to the maximum hop count 345 and the time need to relay the MR 400 back towards the GH 10, e.g., hops needs is the current hop count to GH. The waiting period is calculated using the following formula:

$$\text{waiting period} = (pk + p(k+1) + \ldots pn)*(HBtxTime + \text{Forward Delay}) + (p2 + 2*p3 + \ldots + (k-2)p(k-1))*(MRtxTime + \text{Relay Delay}), \quad (3)$$

k is the current hop count from GH 10 for the calculating GN 15. The waiting period is a worst case time period. The broadcasting delay includes two components: the waiting period and a random delay. The broadcasting delay is calculated using the following formula:

$$\text{broadcasting delay} = \text{waiting period} + \text{random delay}, \quad (4)$$

The waiting period is calculated using formula (3) and the random delay is assign 0<random delay<maximum allowable delay 350.

At step 615, the GN 15 broadcasts the MR 400 after waiting for the broadcasting delay.

Figure 7:
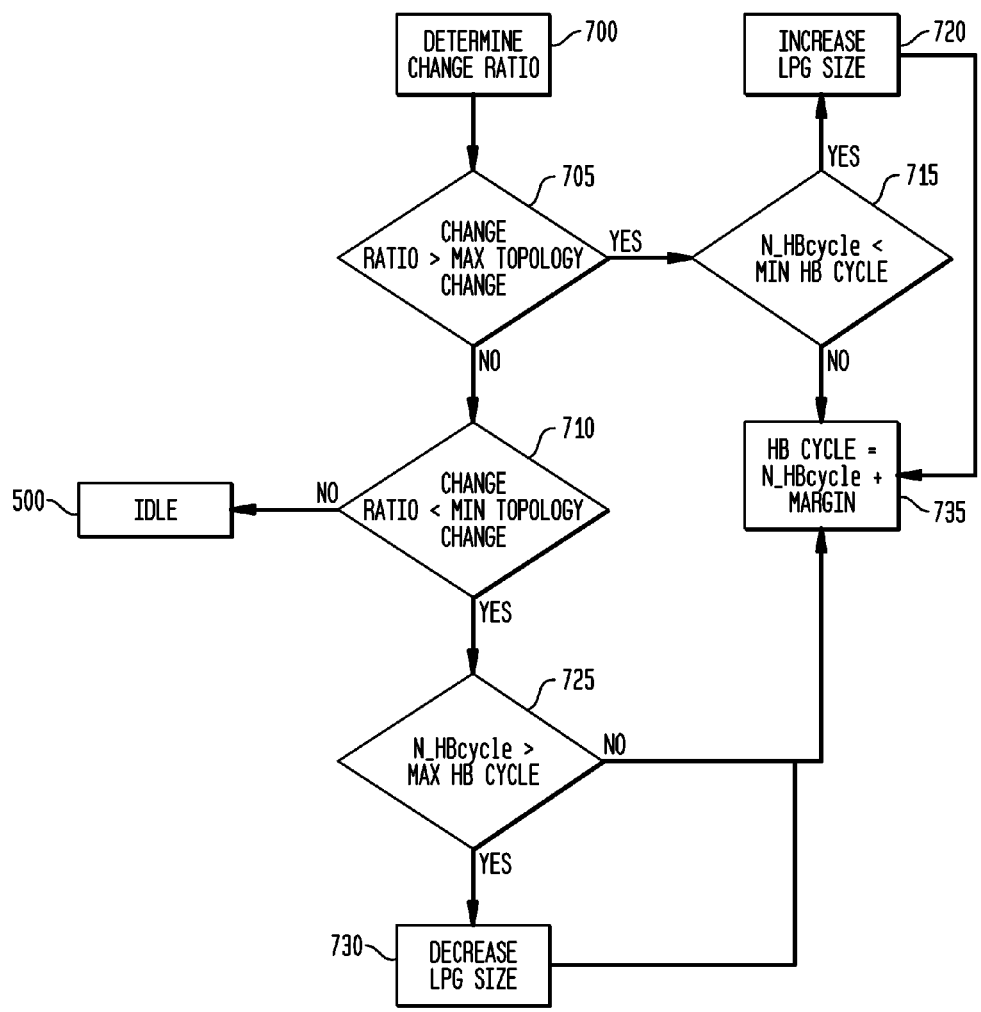
FIG. 7 illustrates a flow diagram of a method of modifying a heartbeat cycle according to the invention.

As depicted in FIG. 5, the delay determination is interrelated to the heartbeat cycle control, e.g., delay is a function of N_HBcycle. FIG. 7 is a flow chart of the control method for adjusting the heartbeat cycle by the GH 10 and the relationship of the cycle and size of the LPG. Prior to the broadcasting the next heartbeat 300, the GH 10 determines a change ratio for the LPG, at step 700. The change ratio is based upon the number of new GNs 15 in the LPG 1 and the number of old GNs 15 that have left the LPG 1. New GNs 15 are added to the membership list and leaving GNs are deleted. The determined change ratio is compared with a MIN and MAX change ratio, at steps 705 and 710. If the determined change ratio is greater than the MAX change ratio, the heartbeat cycle is decreased. If the determined change ratio is less than the MIN change ratio, the heartbeat cycle is increased. The amount of the increase or decrease is based upon a percentage of previous heartbeat cycle, e.g., 10%. If the change ratio is between the MIN and MAX change ratio (no at step 710), the GH 10 returns to an idle state (step 500).

The minimum and maximum change ratios are dynamically adjustable based upon the current environmental conditions such as, but not limited to, MAC performance, number of nodes, average number of new nodes is n previous heartbeat cycles and number of GH changes.

Frequent topology changes require frequent updates on topology information, i.e., shorter HB cycle. On the other hand, when the topology change is infrequent, less frequent topology information update is need, i.e., longer heartbeat cycle, to maintain the LPG structure and unicast/multicast routes.

At step 715, the GH 10 compares the needed heartbeat cycle, N_HBcycle with the Min heartbeat cycle. The Min heartbeat cycle is the minimum allowable heartbeat cycle. The Min heartbeat cycle is a threshold value the present the heartbeat cycle from become too short. When the heartbeat cycle is too shorter, the amount of overhead is increased beyond an acceptable value. The performance of the LPG when sending data is degraded. Control packets might collide with data packets. If N_HBcycle is less than the Min heartbeat cycle, then the GH will increase the LPG size by increasing the maximum hop count 345, at step 720.

At step 725, the GH 10 compares the needed optimal heartbeat cycle, N_HBcycle with the Max heartbeat cycle. The Max heartbeat cycle is the maximum allowable heartbeat cycle. The Max heartbeat cycle prevents the heartbeat cycle from becoming too large. If the heartbeat cycle is too large, membership information becomes stale and the routing of data packets can fail. For example, a relaying node could leave the LPG 1 without the other GNs 15 or GH 10 realizing the node left.

If N_HBcycle is greater than the Max heartbeat cycle (at step 725), then the GH will decrease the LPG size by decreasing the maximum hop count 345, at step 730. After the size of the LPG is changed, change in size triggers the maximum available delay 350 calculation and heartbeat cycle determination in the next heartbeat cycle.

When heartbeat cycle is not long enough to allow all of heartbeats 300 and MR 400 exchanges, GH 10 will prolong the next heartbeat cycle until it reaches to the maximum HB cycle at step 735. When heartbeat cycle is too long, the GH 10 shorten the next heartbeat cycle until it reaches to the minimum HB cycle at step 735.

After the size of the LPG is changed either at step 720 or 730, the GH 10 sets the next heart beat cycle to equal N_HB cycle+Margin. The Margin accounts for the delays.

If the needed heartbeat cycle (N_HBcycle) is between the MIN and MAX HB cycle, i.e., comparison at step 715 and 725 is NO, the GH 10 adjusts the heartbeat cycle for the next heartbeat to N_HBcycle+a Margin, at step 735.

The heartbeat cycle control attempts to adjust the heartbeat cycle to be longer than N_HBcycle. The margin value is a bias to avoid unnecessary shorter HB cycle and more control overhead. The margin value is dynamically adjustable based upon measured performance parameters, such as, but not limited to MAC channel, collisions, data packets transmitted and received, and lost data packets. The margin can also be based upon the number of GNs 15.

The adjustment to the LPG size (maximum hop count 345) is determined based upon the needed heartbeat cycle, MIN and MAX heartbeat cycle and a change in the number of GNs 15 in the LPG 1. If the heartbeat cycle cannot be controlled to be maintained within Max/Min value, the size of LPG is adjusted. If the size of the LPG must be increased, GH 10 does not have information regarding possible new members. Accordingly, the GH 10 increases the maximum hop-count gradually, i.e., only one hop at a time. On the other hand, GH can decrease the size of LPG without gradual decrease of hop-count because the GH 10 knows the number of members in each hop from the membership list.

Additionally, when the size of the LPG 1 is increased, the LPG could absorb any neighboring LPGs if the priority of the growing LPG is high. If the priority is lower then neighboring LPGs', the size of LPG would not grow even if the HC increases.

Figure 8:
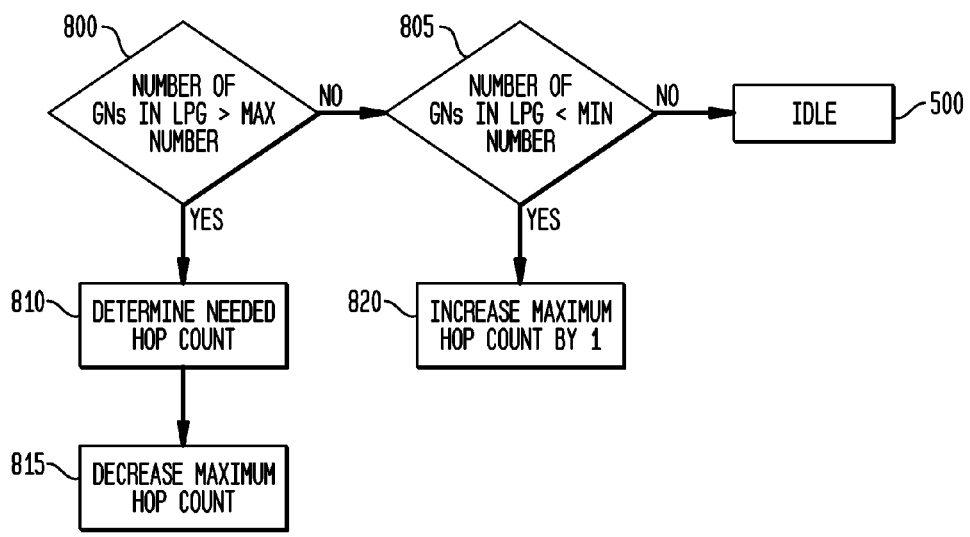
FIG. 8 illustrates a flow diagram of a method of changing the size of a local peer group according to the invention.

FIG. 8 illustrates a method of adjusting the size of the LPG according to the invention. At steps 800 and 805, the GH 10 compares the number of GNs 15 in the LPG 1 with a minimum and maximum number of members. The minimum and maximum number of members is adjustable based upon the current environment. If the number of GNs 15 is greater than the MAX number (of members), the size of the LPG 1 is decreased. The amount of the decreased is determined in step 810. The GH 10 decreases the size, i.e., reduces the maximum hop count 345 at step 815. If the number of GNs 15 is less than the MIN number (of members), the size of the LPG 1 is increased, at step 820. The maximum hop count 345 is incremented by 1. The increase is repeated until the needed heartbeat cycle is greater than MIN HB cycle. When the increase in hop count does not increase the number of members, e.g., increase number of GNs, the increase is stopped. The number of new members for each increase is determined during each of the next heartbeat cycles. For example, if the size of the LPG 1 is increased by three, three heartbeat cycles would be needed, one-hop increase per cycle. The GH 10 would evaluate the number of new members and recalculate the needed heartbeat cycle (N_HBcycle) during each cycle. The new needed heartbeat cycle would be greater since the number of members would be larger.

If the number of GNs 15 is between the MIN and MAX number, the LPG 1 size remains the same and the GH proceeds to an idle state at step 500.

If the size control is triggered by the heartbeat cycle control, the process begins at either step 810 or 820.

Figure 9:
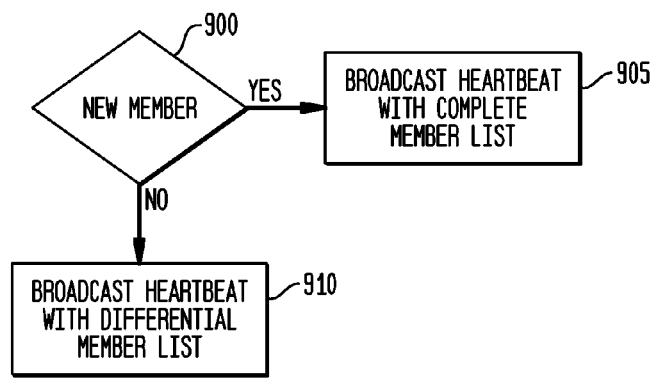
FIG. 9 illustrates a flow diagram of a method for selecting a type of heartbeat according to the invention.

FIG. 9 illustrates a flow chart for a method of determining the type of heartbeat 300 that the GH 10 will broadcast. The heartbeat 300 can include either a complete membership list or an incremental (partial/differential) membership list. The incremental (differential) member list advertisement reduces the size of heartbeat 300 significantly. The member list in the heartbeat 300 is the major contributor for the large size of heartbeat 300. As depicted in FIG. 9, the decision regarding whether to include a complete membership list verses an incremental member list is based upon the stability of the network topology. GH 10 decides ether incremental or full (regular) member list based on the topology change statistics and joining members. At step 900, the GH 10 determines if a new member has joined the LPG 1. Incremental member list cannot be used at LPG forming stage. Joining GN 15 cannot build full topology information out of incremental member list, i.e., full membership list. The GH 10 identifies if any new GN 15 joined the LPG 1 in the previous heartbeat cycle. The GH 10 examines the membership list. When there are no new members, the GH 10 broadcasts the heartbeat 300 with an incremental membership list, at step 910. When new GNs 15 join the LPG 1, the GH 10 broadcasts a heartbeat 300 with a complete membership list. In another embodiment, the GH 10 can determine which list to include using a previous cycles heartbeat reception ratio or a calculated change ratio for n previous heartbeat cycles, where n is the number of previous cycles, "n" is adjustable.

FIG. 10 illustrates a method of controlling the HB and MR wait time according to the invention. The GH 10 controls the HB and MR wait time is to reduce faulty membership changes (faulty member departure and faulty new LPG creation) because of poor reception of heartbeat 300 or MR 400, i.e., wireless interference or packet collision.

When the reception rate is poor, the wait time can be prolonged. On the other hand, longer wait time slows down the departure detection. In an embodiment, a default wait time is used when the reception is good. The default time is short. When faulty membership changes are detected, the time is lengthened, i.e., use variable time instead of default.

One indication of a faulty membership change is a frequent member departure/join of a GN 15 in the middle region of LPG 1.

At step 1000, the GH 10 determines LPG statistics. The LPG statistics include number of GH changes and number of members re-joining the LPG 1. At steps 1005, 1010, 1015 and 1020, the GH 10 evaluates the statistics for stability or fault. Steps 1005 and 1010 evaluate the statistics relating to the GH changes and steps 1015 and 1020 evaluate the statistics relating to the number of members re-joining the LPG 1.

If the GH 10 determines, at step 1005 that the number of GHs changes, which is indicative of a faulty GH, the HB wait time 340 is increased at step 1025. If there is no change in GH, the GH statistics (at step 1010) indicate that the LPG is stable, the GH 10 will determine if the HB wait time 340 is greater than the default minimum value, at step 1030. The GH 10 compares the current HB wait time 340 with the default wait time, i.e., minimum wait time. If the current HB wait time 340 is larger than the default wait time, the current HB wait time 340 is decreased at step 1035. If the current HB wait time 340 is equal to the default wait time, the time is unchanged.

If the GH 10 determines, at step 1015 that the number of re-joining members is significantly greater than zero, which is indicative of a faulty deletion of a member, the MR wait time is increased at step 1040. If the number of re-joining members is zero, the LPG is stable, and the GH 10 will determine if the MR wait time is greater than the default minimum value, at step 1045. The GH 10 compares the current MR wait time with the default wait time, i.e., minimum wait time. If the current MR wait time is larger than the default wait time, the current MR wait time is decreased at step 1050. If the current MR wait time is equal to the default wait time, the time is unchanged. Each increase or decrease is by 1 heartbeat cycle.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for maintaining a local peer group, said local peer group being formed from a plurality of moving vehicles, each equipped with a wireless communications device, one of the plurality of moving vehicles is selected as a group header node (GH) the method comprising:
    receiving periodically a heartbeat packet from the GH, the heartbeat packet including a maximum relay hop count to control size of a local peer group formed from a plurality of moving vehicles and a heartbeat cycle period;
    forwarding the heartbeat packet from a moving vehicle until the maximum relay hop count is reached after waiting for a first random relay delay assigned by a member node, said first random relay delay is set to be less than a maximum allowable adjustable value;
    replying to the heartbeat packet with a membership report packet;
    forwarding a membership report packet towards the GH; and
    adding a moving vehicle that submitted the membership report packet to a local peer group membership as a member node of the local peer group if the membership report packet is new or updating membership information for a member node.

2. The method according to claim 1, wherein said maximum allowable adjustable value is determined by the GH.

3. The method according to claim 1, wherein said forwarding of the membership report packet is delayed by a second random relay delay, said second random relay delay is based upon the maximum allowable adjustable value.

4. The method according to claim 3, further comprising:
    selecting a new group header node if a heartbeat packet is not received within a period of time.

5. The method according to claim 4, wherein said period of time is adjustable.

6. The method according to claim 3, further comprising deleting a member node from a membership list maintained by the GH, if a membership report packet is not received from the member node with a second period of time.

7. The method according to claim 6, wherein said second period of time is adjustable and is a multiple of the heartbeat cycle period.

8. The method according to claim 1, wherein a subset of the heartbeat packet includes a complete membership list.

9. The method according to claim 8, wherein a number of heartbeat packets in the subset is adjustable.

10. The method according to claim 1, wherein said heartbeat cycle period is adjustable based on a number of membership changes detected by the GH.

11. The method according to claim 1, wherein said maximum relay hop count is adjustable.

12. The method according to claim 1, wherein said membership report packet includes an identifier of an originating moving vehicle, a list of members of the local peer group which are reachable via the originating moving vehicle, and a hop count from the GH, each of the membership report packet is broadcast after a third delay, said third delay is calculated by the originating moving vehicle.

13. The method according to claim 12, wherein said third delay is calculated based upon a wait period and the maximum allowable adjustable value.

14. The method according to claim 12, wherein the wait period is determined by an order of an identifier of originating moving vehicle in a membership list in the heartbeat packet.

15. The method according to claim 1, further comprising
transmitting a membership report packet from each member node, said membership report packet includes an identifier of an originating moving vehicle, members of the local peer group and a hop count, each of said membership report packets is transmitted after a second delay, said second delay is calculated based upon a wait period and a random wait time, said random wait time is less than the maximum allowable adjustable value, said wait period is based upon the maximum relay hop count;
relaying said membership report towards the selected GH after a third random delay, said third random delay is less than the maximum allowable adjustable value;
selecting a new group header node if a heartbeat packet is not received within a period of time, said period of time being adjustable;
deleting a member node from the local peer group membership if a membership report packet is not received from the member node within a number of heartbeat cycles where the number is adjustable; and
controlling a time of each adjustment and wherein said maximum relay hop count and heartbeat cycle period is adjustable.

16. The method according to claim 15, wherein said heartbeat packet further includes vehicle information corresponding to the moving vehicle of the GH and performance information, and wherein each of said membership report packets further includes vehicle information corresponding to the moving vehicle of the member node and performance information.

17. The method according to claim 16, wherein said vehicle information includes make and model of the vehicle, speed, direction of travel and position and performance information includes number of packets send, relayed and received.

18. The method according to claim 16, wherein each of said adjusting is based upon the vehicle information and performance information.

19. The method according to claim 17, wherein said GH determines a number of moving vehicles at each hop within the local peer group based upon the vehicle information and wherein said maximum relay hop count is determined based at least upon the number of moving vehicles at each hop.

20. The method according to claim 19, wherein said GH uses the number of moving vehicles at each hop and said maximum relay hop count to determine the maximum allowable adjustable value.

21. The method according to claim 19, wherein said GH uses the number of moving vehicles at each hop and said maximum relay hop count to determine the adjustable heartbeat cycle period.

22. The method according to claim 21, wherein said adjustable heartbeat cycle period is based upon a time needed to forward the heartbeat packet to moving vehicles at the maximum relay hop count, broadcast a membership report packet and forward a membership report packet to the GH from moving vehicles at the maximum relay hop count and a time reserved for new moving vehicles that are not already member nodes of the local peer group.

23. A computer readable medium storing a computer readable program of instructions for execution by a computer, the instruction causing the computer to perform a method of maintaining a local peer group, said local peer group being formed from a plurality of moving vehicles, each equipped with a wireless communications device, one of the plurality of moving vehicles is selected as a group header node (GH), the method comprising:
receiving periodically a heartbeat packet from the GH, the heartbeat packet including a maximum relay hop count to control size of a local peer group formed from a plurality of moving vehicles and a heartbeat cycle period;
forwarding the heartbeat packet from a moving vehicle until the maximum relay hop count is reached after waiting for a first random relay delay assigned by a member node, said first random relay delay is set to be less than a maximum allowable adjustable value;
replying to the heartbeat packet with a membership report packet;
forwarding a membership report packet towards the GH; and
adding a moving vehicle that submitted the membership report packet to a local peer group membership as a member node of the local peer group if the membership report packet is new or updating membership information for a member node.

* * * * *